July 7, 1925.                                                              1,544,608
R. B. SMITH ET AL
FLOAT VALVE
Original Filed Nov. 5, 1923    2 Sheets-Sheet 1
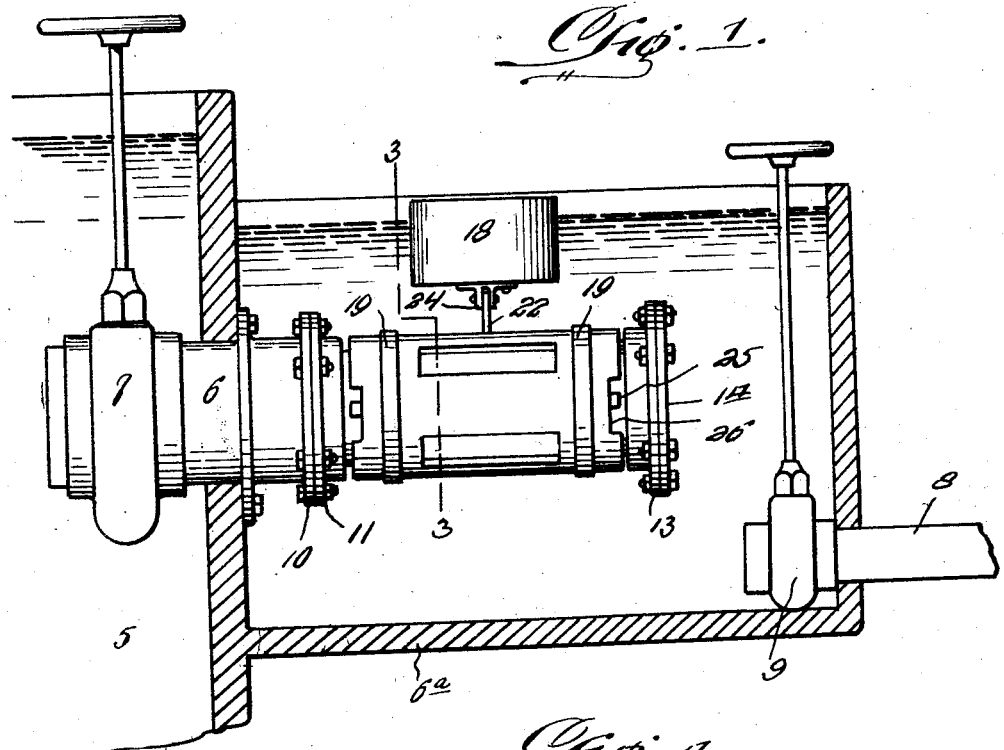
Fig. 1.
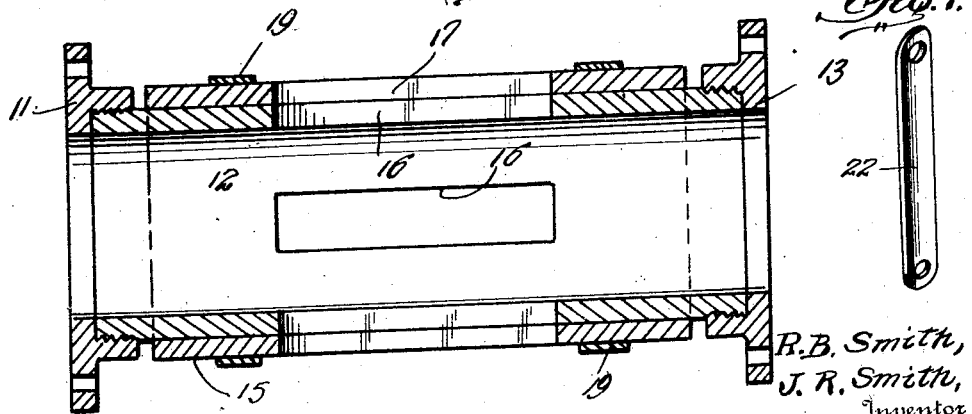
Fig. 4.
Fig. 7.
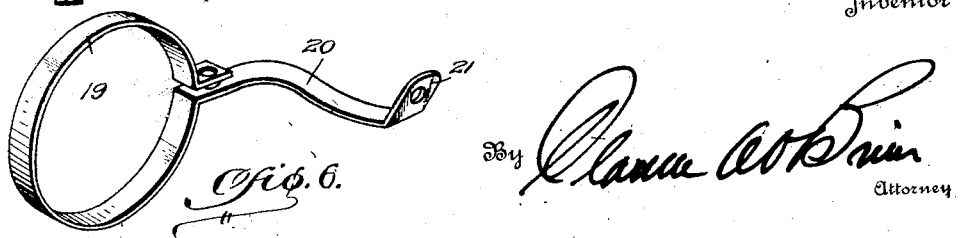
Fig. 6.
R. B. Smith,
J. R. Smith,
Inventor
By Clarence A. O'Brien
Attorney July 7, 1925. 1,544,608
R. B. SMITH ET AL
FLOAT VALVE
Original Filed Nov. 5, 1923 2 Sheets-Sheet 2

R. B. Smith,
J. R. Smith,
Inventor

Witnesses:

Patented July 7, 1925.

1,544,608

UNITED STATES PATENT OFFICE.

RICHARD BLACKWELL SMITH AND JAMES R. SMITH, OF CLAREMONT, CALIFORNIA.

FLOAT VALVE.

Application filed November 5, 1923, Serial No. 672,885. Renewed May 12, 1925.

*To all whom it may concern:*

Be it known that we, RICHARD BLACKWELL SMITH and JAMES R. SMITH, citizens of the United States, residing at Claremont, in the county of Los Angeles and State of California, have invented certain new and useful Improvements in Float Valves, of which the following is a specification.

This invention has reference to float valves for automatically maintaining a fluid at a constant predetermined level within a tank, container, or the like.

The primary object of the invention is to provide a float valve of simple and durable construction, and one which will operate efficiently for a comparatively great length of time without requiring adjustment or repairs.

A further object of the invention is to provide a float valve that is smooth in action, well adapted for use in canals and reservoir outlets, and capable of being installed upon existing equipment without material changes in the latter.

A further object of the invention is to provide a float valve which may be cheaply and easily installed as well as easily cleaned.

Other objects will appear as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is a view, partly in section and partly in side elevation, showing a float valve constructed in accordance with the present invention applied to the outlet of the reservoir of an irrigating system, and positioned within the stand box of said system.

Figure 4 is a central longitudinal sectional view of a device shown in Figure 3.

Figure 6 is an enlarged perspective view of one member of the float operated arm of the movable valve member, and Figure 7 is a view similar to Figure 6 of the links employed for connecting the valve arm with the float.

Figure 2:
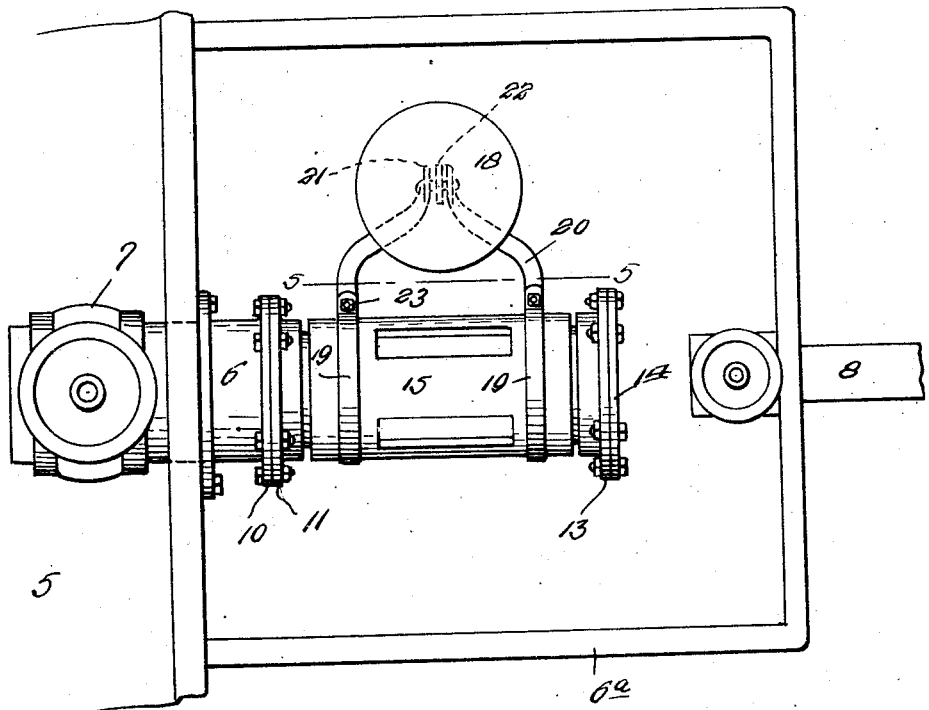
Figure 2 is a top plan view of the device shown in Figure 1.

Referring in detail to the drawings, 5 indicates the water supply reservoir of an irrigating system, through one wall of which extends a horizontal outlet pipe 6, the inner end of which is disposed within the reservoir, and is provided with a control valve 7 of the gate type, as is well known in the art, said outlet pipe 6 projecting into the stand box 6ª of the irrigating system below the normal water level therein. This stand box is provided with a bottom outlet pipe 8 through which the flow of water is controlled by means of a gate valve 9 located inwardly of one wall of said stand box, it being understood that the pipe 8 leads to the irrigating ditches in a well known manner.

In accordance with the present invention, the outer end of the outlet pipe 6 is provided with an out-turned annular flange 10 having openings adapted to be aligned with similar openings provided in the flange of an annular member or ring 11 that is threaded upon one end of a cylindrical stationary valve member 12, whereby said valve member is rigidly connected to the outer end of the outlet pipe 6. A flanged ring 13 similar to the ring 11 is threaded upon the other end of the cylindrical valve member 12 and has openings in the flange thereof adapted to register with openings in an end closure disc 14 whereby the latter may be bolted rigidly against the ring 13 for closing the outer end of the cylindrical valve member 12.

Rotatably and snugly fitted upon the cylindrical valve member 12 is a movable valve member 15 in the form of a sleeve or cylinder that is disposed between the rings 11 and 12. Obviously, in assembling this structure, the sleeve or cylindrical valve member 16 is disposed upon the stationary valve member 12 prior to threading the rings 11 and 13 thereon.

The inner stationary cylindrical valve member 12 is provided with a circular series of longitudinally elongated and uniformly spaced slots 16 which form outlet ports through which water may flow from the pipe 6 into the stand box 6ª when opened, and the rotatable sleeve valve or cylindrical valve member 15 is provided with a circular series of similarly related longitudinally extending elongated slots 17 that are similar to the slots 16 of the valve member 12, so that when the rotatable sleeve valve 15 is rotated relative to the inner stationary valve member 12, the relationship between the slots 16 and 17 will be varied for correspondingly controlling the amount of water allowed to flow from the outlet pipe 6 into the stand box 6ª.

Figure 5:
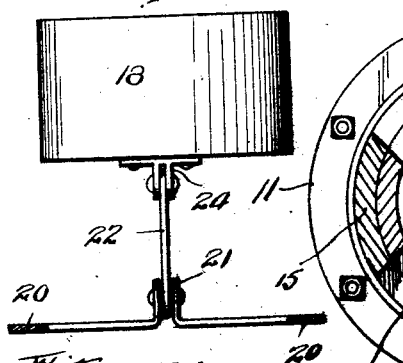
Figure 5 is an enlarged longitudinal sectional view, taken on the line 5—5 of Figure 2.
Figure 3:
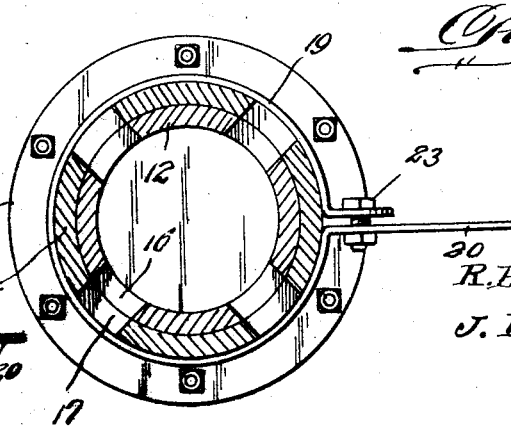
Figure 3 is a transverse sectional view, taken substantially upon the line 3—3 of Figure 1, but with the movable valve member rotated to open position.

The rotatable sleeve valve 15 is provided with a rigid arm for facilitating connection of a float 18 thereto, whereby when the level of the water within the stand box rises, the valve 15 will be caused to rotate, so as to bring the slot 17 thereof out of register with the slot 16 of the inner valve member 12, at which time the portions of the sleeve valves between its slots will act as a means for closing the slots 16 of the inner valve member 12. This arm preferably consists of a pair of members each including a clamp band 19 adapted to be secured upon one end of the rotatable valve member 15 and an arm member 20 rigid with each clamp band 19 and extending laterally from the valve member 15 at one side of the latter, the arm members 20 also converging toward each other at their outer ends and terminating in adjacent spaced relation in the form of upturned ears 21 between which is pivoted the lower end of a link 22. The clamp bands 19 are preferably integral with the arm members 20 thereof and fastened tightly upon the ends of the rotatable valve member 15 by the clamping bolts 23 thereof. The upper end of the link 22 is pivoted between a pair of ears 24 forming part of a bracket rigidly fastened to the under side of a float 18 as shown clearly in Figure 5. By means of this construction, the float 18 will lower when the level of water within the stand box lowers so as to cause rotation of the sleeve valve 15 in a direction for bringing the slots 16 and 17 into registering relation so as to increase the flow of water through the pipe 6 into said stand box.

Suitable means is provided for limiting the rotation of the valve 15 so that the latter may not rotate in one direction past the position wherein the same is fully opened and so that the same may not rotate in the other direction past the position wherein the same is fully closed. This means may consist of rigid pins 25 projecting outwardly from the stationary valve cylinder 12 and positioned in elongated notches 26 provided in opposite ends of the rotatable valve member or sleeve 15 as shown clearly in Figure 1.

Should any dirt or obstruction flow into the inner stationary valve member 12 from the reservoir 5, it may be readily removed by detaching the removable disc or closure plate 14 upon the outer end of the valve member 12.

From the foregoing description, it is believed that the construction and operation, as well as the advantages of the invention will be readily understood and appreciated by those skilled in the art.

Minor changes may be made without departing from the spirit and scope of the invention as claimed.

What we claim as new is:

A float valve comprising an inner cylindrical valve member having means upon one end thereof for rigidly securing the same to the end of a stationary horizontal outlet pipe and provided with a closure at the other end, said stationary valve member having a circular series of outlet ports intermediate its ends, a rotatable sleeve valve fitted upon said stationary valve member and having a circular series of outlet ports adapted to be brought into and out of register with the ports of the inner valve member when rotated, an arm rigid with and projecting from one side of said sleeve valve, a float flexibly connected to the outer end of said arm in a position to move in a direction at right angles to the longitudinal axis of the sleeve valve for rotating the latter, said arm comprising a pair of arm members having clamping bands upon the inner ends thereof respectively secured upon opposite ends of the sleeve valves and arranged in outwardly converging relation, the outer ends of said arm members terminating in upturned ears arranged in adjacent spaced relation, and means for flexibly connecting said arms to the float comprising a link having opposite ends respectively pivoted to the float and to the ears of the arm member.

In testimony whereof we affix our signatures.

RICHARD BLACKWELL SMITH.
JAMES R. SMITH.